United States Patent [19]

Fujiki

[11] Patent Number: 4,524,398
[45] Date of Patent: Jun. 18, 1985

[54] VELOCITY CONTROL DEVICE FOR MAGNETIC DISC APPARATUS AND METHOD THEREFOR

[75] Inventor: Masao Fujiki, Tokyo, Japan

[73] Assignee: Tokyo Shibaura Denki Kabushiki Kaisha, Kawasaki, Japan

[21] Appl. No.: 494,019

[22] Filed: May 12, 1983

[30] Foreign Application Priority Data

May 17, 1982 [JP] Japan .................................. 57-82667

[51] Int. Cl.³ .............................................. G11B 5/55
[52] U.S. Cl. ...................................................... 360/78
[58] Field of Search ......................................... 360/78

[56] References Cited

U.S. PATENT DOCUMENTS

| | | | |
|---|---|---|---|
| 4,048,660 | 9/1977 | Dennison et al. | 360/77 |
| 4,096,579 | 6/1978 | Black et al. | 364/900 |
| 4,297,734 | 10/1981 | Laishley et al. | 360/78 |
| 4,390,912 | 6/1983 | Hertrich et al. | 360/78 |
| 4,462,053 | 7/1984 | Lum et al. | 360/78 |

OTHER PUBLICATIONS

IEEE Transactions on Magnetics, vol. MAG-17, No. 4, Jul. 1981, High Track Density for Magnetic Disk Drives with an 'Embedded Servo' Positioning System, C. Maury, pp. 1396-1402.

*Primary Examiner*—George G. Stellar
*Attorney, Agent, or Firm*—Cushman, Darby & Cushman

[57] ABSTRACT

A velocity control system for a magnetic disc apparatus has: a circuit for generating a two-phase position signal which is used to determine the position of the magnetic head; an A/D converter for converting the two-phase position signal to a digital signal; a microprocessor for computing a target velocity and a real velocity which correspond to a distance between the target track and the current position of the magnetic head in accordance with the digital signal, and for computing a velocity difference between the target velocity and the real velocity; a D/A converter for converting a signal corresponding to the velocity difference to an analog signal; and a linear motor for driving the magnetic head to control the seek velocity of the magnetic head, in accordance with the analog signal.

2 Claims, 32 Drawing Figures

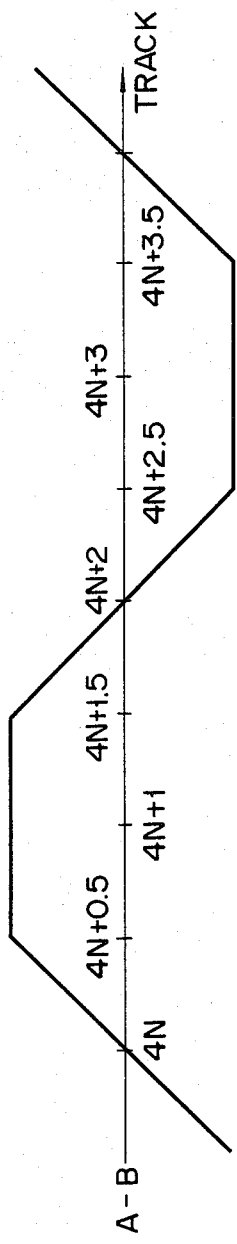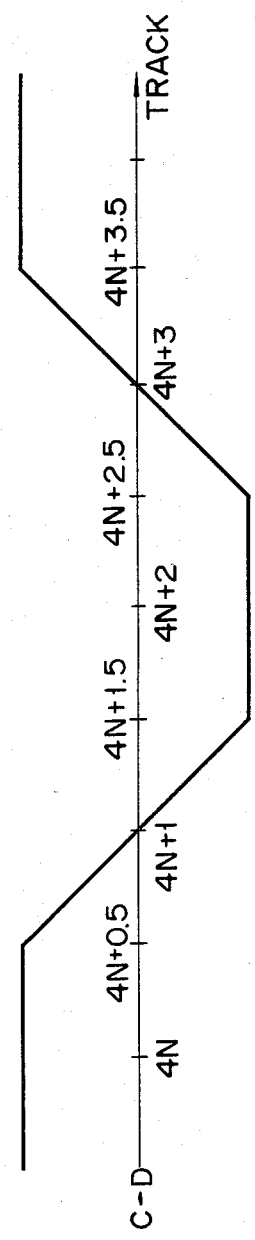

FIG. 16

| ZONE AT PREVIOUS SAMPLING / ZONE AT CURRENT SAMPLING | ZONE S | ZONE T | ZONE U | ZONE V |
|---|---|---|---|---|
| ZONE S | (CURRENT A-B) -(PREVIOUS A-B) | (PREVIOUS C-D)- (C-D)MIN+ (CURRENT A-B)- (A-B)MIN+2 TRACKS | (PREVIOUS A-B)- (CURRENT A-B)- 2(A-B)MIN+ 1 TRACK | (C-D)MAX- (PREVIOUS C-D)- (CURRENT A-B) -(A-B)MIN |
| ZONE T | (A-B)MAX- (PREVIOUS A-B)+ (C-D)MAX- (CURRENT C-D) | (PREVIOUS C-D) -(CURRENT C-D) | (PREVIOUS A-B) -(A-B)MIN +(C-D)MAX -(CURRENT C-D) +2 TRACKS | 2(C-D)MAX -(PREVIOUS C-D) -(CURRENT A-B) +1 TRACK |
| ZONE U | 2(A-B)MAX- (PREVIOUS A-B) -(CURRENT A-B) +1 TRACK | (PREVIOUS C-D)- (C-D)MIN +(A-B)MAX -(CURRENT A-B) | (PREVIOUS A-B) -(CURRENT A-B) | (C-D)MAX -(PREVIOUS C-D) +(A-B)MAX -(CURRENT A-B) +2 TRACKS |
| ZONE V | (A-B)MAX- (PREVIOUS A-B)+ (CURRENT C-D)- (C-D)MIN+2 TRACKS | (PREVIOUS C-D)+ (CURRENT C-D)-2 (C-D)MIN+ 1 TRACK | (PREVIOUS A-B) -(A-B)MIN +(CURRENT C-D) -(C-D)MIN | (CURRENT C-D) -(PREVIOUS C-D) |

VELOCITY CONTROL DEVICE FOR MAGNETIC DISC APPARATUS AND METHOD THEREFOR

BACKGROUND OF THE INVENTION

The present invention relates to a velocity control device and method for a magnetic disc apparatus so as to allow a magnetic head to seek a target track.

Recently, in a conventional compact magnetic disc apparatus, one side of the magnetic disc is entirely used for storing not only servo data of magnetic head positioning. As shown in FIG. 1, data sectors 2 and servo sectors 3 for storing servo data may be intermixed in a data area of a magnetic disc 1. The magnetic disc apparatus of this type allows effective utilization of the data area on the magnetic disc.

However, in a magnetic disc apparatus having no special servo data area as described above, position data of the magnetic head is not always obtained. In fact, the position data is obtained only from the servo sectors 3 shown in FIG. 1. Servo data is written in the servo sectors 3 so as to produce a periodic output voltage shown in FIG. 2 when the magnetic head is moved in the radial direction of the magnetic disc 1. Referring to FIG. 2, the output voltage at 0 V corresponds to one of a plurality of concentric circles. Each concentric circle is called a track. About 30 servo sectors are required to properly access the magnetic head on the tracks. Moving the magnetic head from one track to another is called a "seek" operation.

In the case of performing a seek operation by the magnetic head, the conventional magnetic disc apparatus has the following drawback. Since servo data cannot be obtained in an area between two adjacent servo sectors (i.e., in a data sector), the output signal shown in FIG. 2 cannot be obtained when the magnetic head is aligned with a data sector.

Under these conditions, sampled signals are plotted in FIG. 2 for the velocities of the magnetic head, (i) 0.1 tracks/sector (indicated by circles), (ii) 0.5 track/sector (indicated by squares), and (iii) 1.5 tracks/sector (indicated by x). As may be apparent from FIG. 2, the position of the magnetic head can not be detected when the velocity exceeds 1 track/sector. Therefore, the magnetic head must be moved along the data sector at a velocity of one track/sector or less, thereby prolonging the seek time.

SUMMARY OF THE INVENTION

It is, therefore, an object of the present invention to provide a velocity control device for a magnetic disc apparatus and a method therefor, wherein the position of a magnetic head can be detected with high precision so as to shorten a seek time, even when the magnetic head is moved for a distance corresponding to more than one track between servo sectors.

In order to achieve the object of the present invention, a velocity control device for a magnetic disc apparatus for reading out data from or writing it on a recording track of a magnetic disc having servo sectors and data sectors, using a magnetic head, comprises:

(a) position signal generating means for generating a two-phase signal which determines a target position of said magnetic head;

(b) analog-to-digital signal converting means for converting the two-phase signal to a digital signal;

(c) computing means for computing a target velocity and a real velocity of said magnetic head from the digital signal, and for computing a difference between the target velocity and the real velocity;

(d) digital-to-analog signal converting means for converting the difference obtained by said computing means to an analog signal; and (e) driving means for driving said magnetic head in accordance with the analog signal.

BRIEF DESCRIPTION OF THE DRAWINGS

Other objects and features of the present invention will be apparent from the following description taken in connection with the accompanying drawings, in which:

FIGS. 14A and 14B are timing charts of the output signals from the operational amplifiers 26 and 27 shown in FIG. 8;

FIG. 16 shows a computation table for computing the travel distance of the magnetic head.

DETAILED DESCRIPTION OF THE PREFERRED EMBODIMENT

Figure 3:
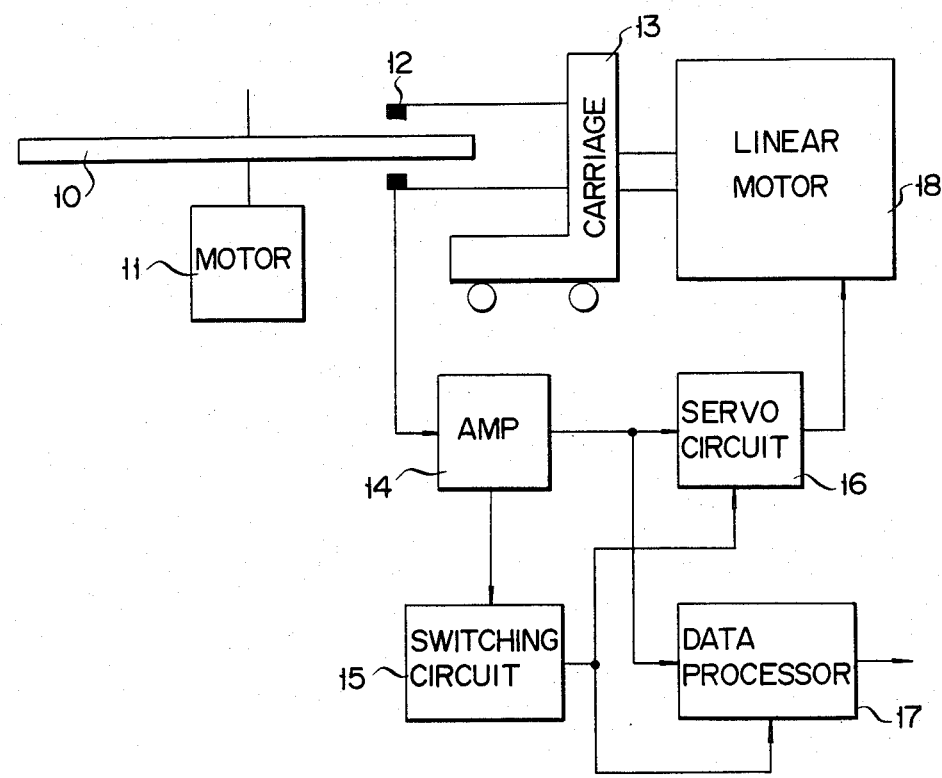
FIG. 3 is a block diagram of a velocity control device of a magnetic disc apparatus according to an embodiment of the present invention.

A velocity control device for a magnetic disc apparatus according to an embodiment of the present invention will be described with reference to the accompanying drawings. FIG. 3 is a block diagram showing a magnetic disc apparatus according to which the present invention is applied. Data sectors and servo sectors are formed intermixed on each side of a magnetic disc 10. The disc 10 is driven by a motor 11. A magnetic head 12 is driven by a carriage 13 to read data from or write it on the magnetic disc 10. It comprises two magnetic elements which are arranged to face the sides of the magnetic disc 10. Data read from the disc 10 by the magnetic head 12 is supplied through an amplifier 14 to a servo circuit 16, a data processor 17 and a switching circuit 15. The switching circuit 15 determines whether the output signal from the amplifier 14 corresponds to the data on a servo sector or the data on a data sector. The switching circuit 15 is switched to drive the servo circuit 16 or the data processor 17 in accordance with the determination result. When the magnetic head 12 is aligned on a data sector, data is read out from the data sector. This data is coded by the data processor 17 to a binary signal which has logic level "1" or "0". The binary signal is then supplied to a higher rank device such as a host computer. When the magnetic head 12 is aligned on a servo sector, the readout data is supplied to the servo circuit 16 to control a linear motor 18. The carriage 13 is mounted on the linear motor 18 and is driven by it.

Figure 4:
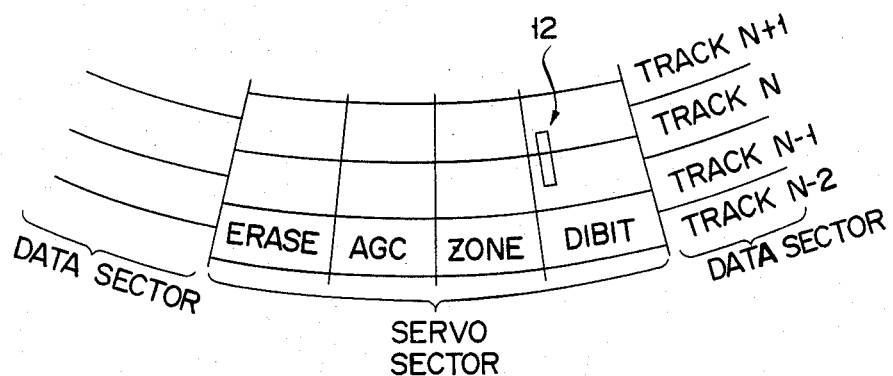
FIG. 4 shows the relationship between data and the servo sectors on the magnetic disc.

FIG. 4 shows the relationship between the data and the servo sectors of the magnetic disc 10. As may be apparent from FIG. 4, a track portion of each data sector is offset by ½ track from that of a corresponding servo sector. Therefore, the magnetic head 12 is aligned on the corresponding track of the data sector to write data on, or read them from the magnetic disc 10. However, the magnetic head 12 is located at a boundary between the corresponding tracks of the servo sector when the magnetic head 12 accesses the servo sector. The servo sector comprises four sections: ERASE, AGC, ZONE and DIBIT. The ERASE section is erased so as to have opposing polarities at two ends thereof, so that no data is read out by the magnetic head 12.

This ERASE section, which indicates a long erased portion, is not present in the data sectors or in any other servo sector sections. The magnetic head produces a output from the data sectors and any other servo sector sections. Therefore, the ERASE section indicates the head of the corresponding servo sector. When the switching circuit 15 receives the output signal produced from the magnetic head 12 which corresponds to the ERASE section, it is electrically connected to the servo circuit 16 or the data processor 17.

Magnetic flux inversion data having a predetermined frequency is written in the AGC section. This data is used to allow the amplifier 14 to perform AGC (automatic gain control). The output signal read by the magnetic head 12 from the inner portion of the magnetic disc differs from that read from the outer portion thereof. However, these different signals are averaged by the AGC.

Figure 1:
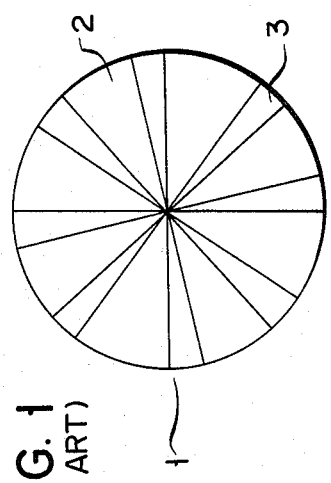
FIG. 1 is a schematic view showing a typical format of a magnetic disc.
Figure 2:
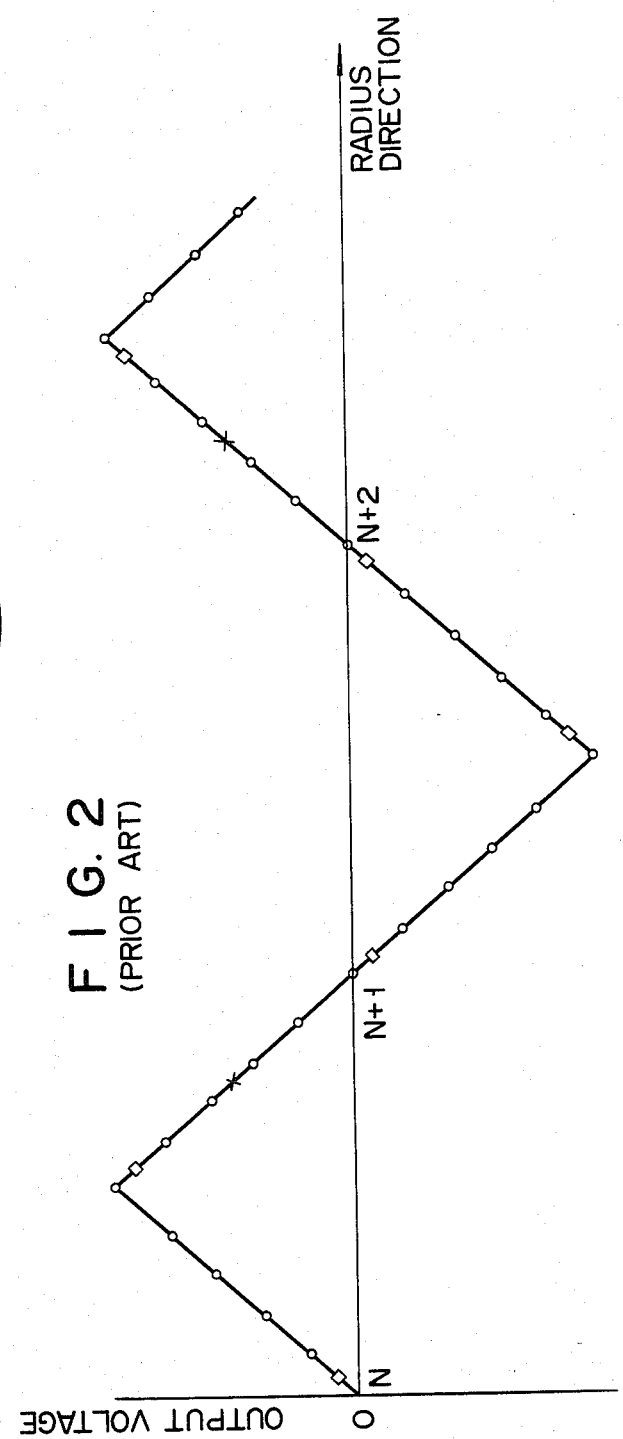
FIG. 2 is a timing chart showing a signal which determines the target position of a magnetic head and which is used in a conventional magnetic disc apparatus.

Data is written in the ZONE section to indicate that a track is used for writing data or reading it or that the track is one of the two guardband zones respectively arranged at the outermost and innermost tracks. Radial position data (data shown in FIG. 2) is written in the DIBIT portion.

Figure 5:
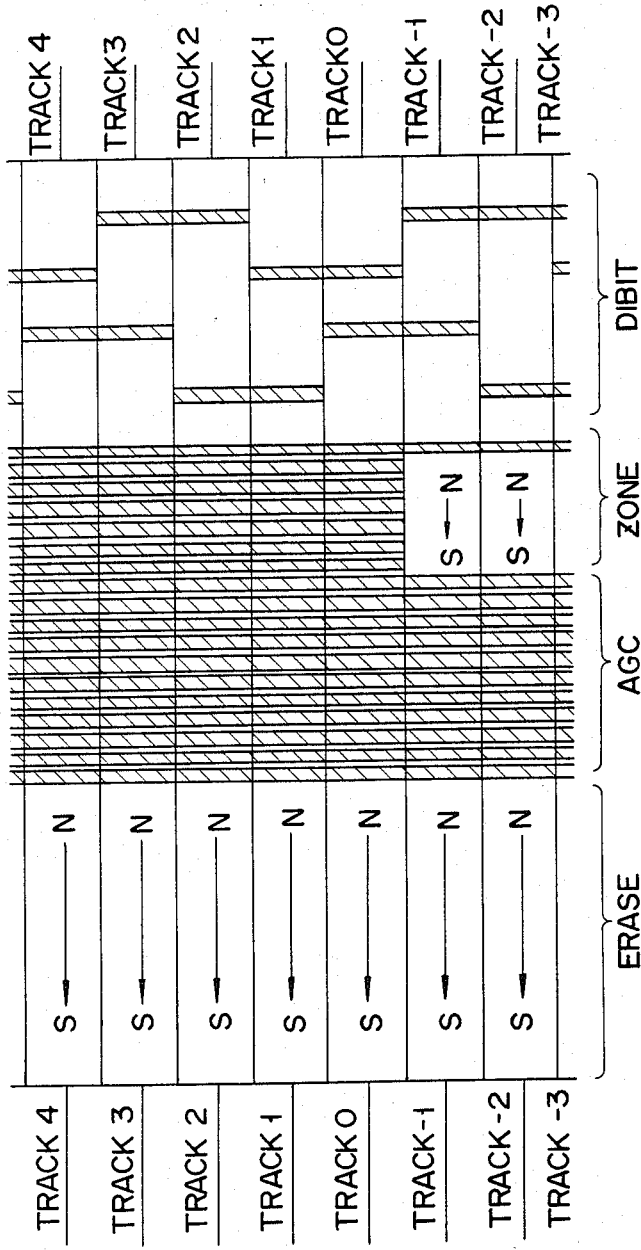
FIG. 5 shows the detailed format of a servo sector shown in FIG. 4.
Figure 6:
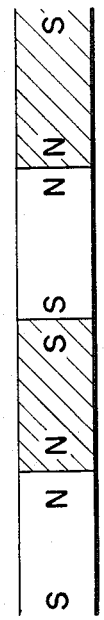
FIG. 6 shows the direction of magnetization in the servo sector shown in FIG. 5.
Figure 7:
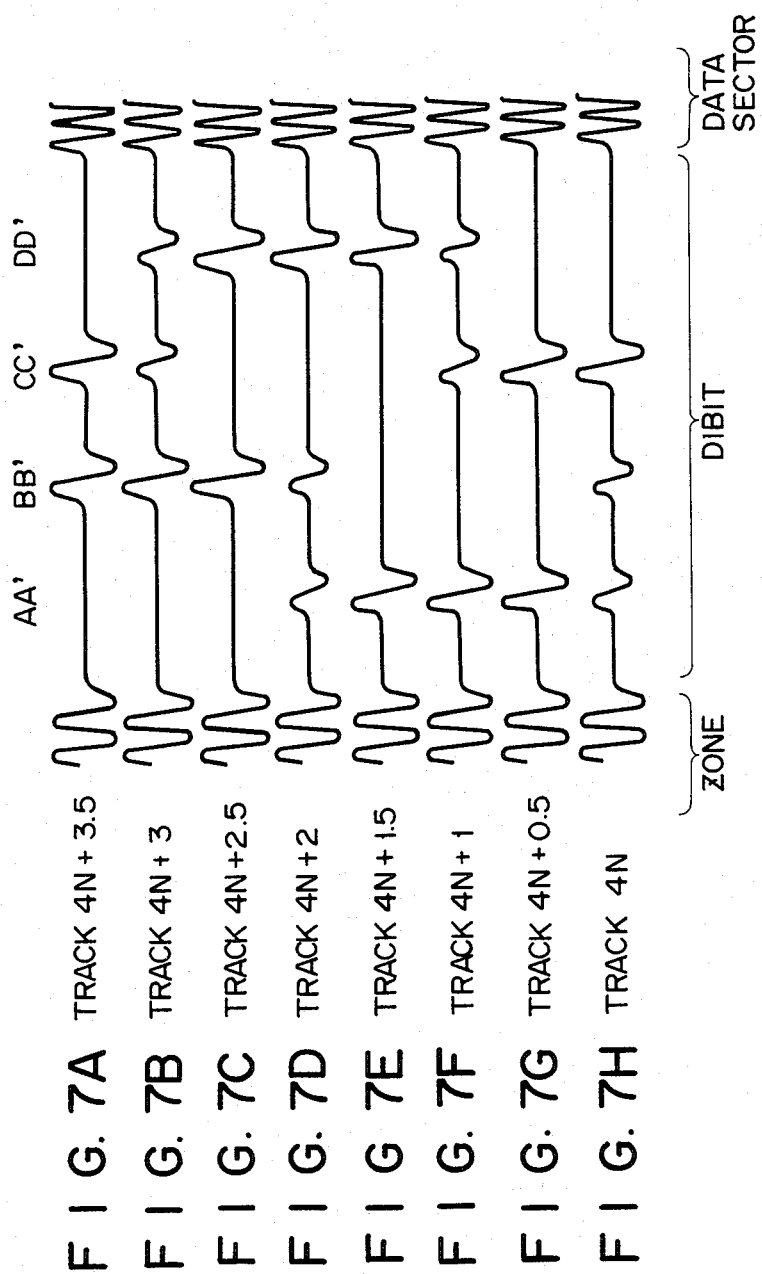
FIGS. 7A to 7H are timing charts of output signals each of which is obtained when the magnetic head is aligned on the corresponding track.

FIG. 5 shows a detailed format of the servo sector. In the ERASE section over the corresponding track portion, data is erased such that the left end thereof corresponds to the S pole and the right end thereof corresponds to the N pole. The same magnetization portion as the ERASE section and a magnetization portion opposite thereto are alternately formed in the AGC section. Magnetic inversion is repeatedly performed in tracks of the ZONE section which are used to write and read data in the same manner as the tracks of the AGC section. In the guardband zones, data is erased in the same manner as in the ERASE section. A magnetization pattern is shown in FIG. 5. The magnetization relationship between the non-hatched portion and the hatched portion is illustrated in an enlarged manner in FIG. 6.

FIGS. 7A through 7H show the output signals from the magnetic head 12 when the magnetic head 12 is aligned with one of track portions of the DIBIT section. When the magnetic head 12 is aligned with radial positions corresponding to tracks 4N, 4N+0.5, 4N+1, 4N+1.5, 4N+2, 4N+2.5, 4N+3 and 4N+3.5, the magnetic head 12 produces the output signals shown in FIGS. 7A through 7H, respectively. Each of the readout signals is amplified by the amplifier 14 shown in FIG. 3. The amplified signal is then supplied to the servo circuit 16.

Figure 8:
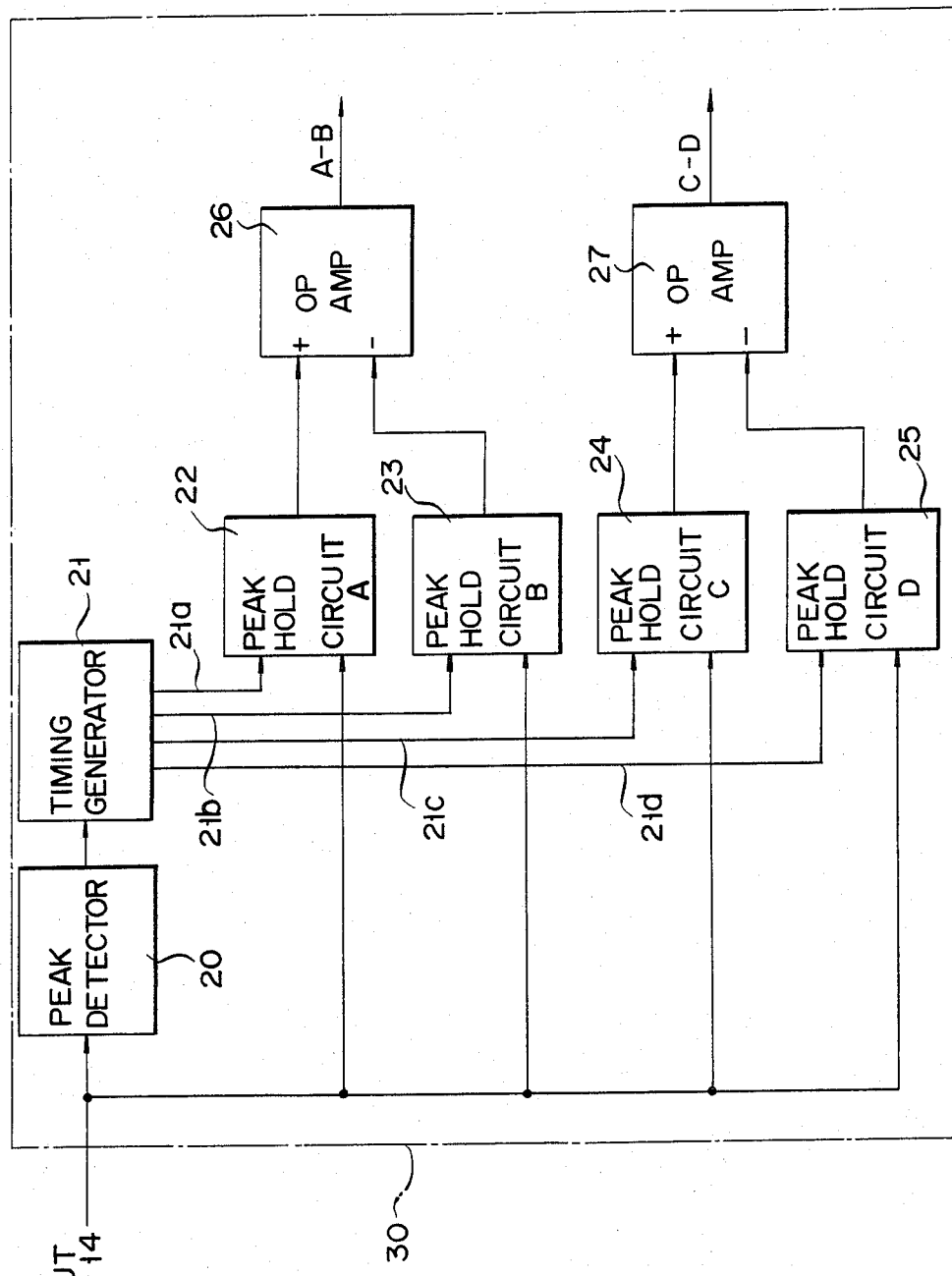
FIG. 8 is a block diagram showing the detailed arrangement of a position signal generator 30.
Figure 9:
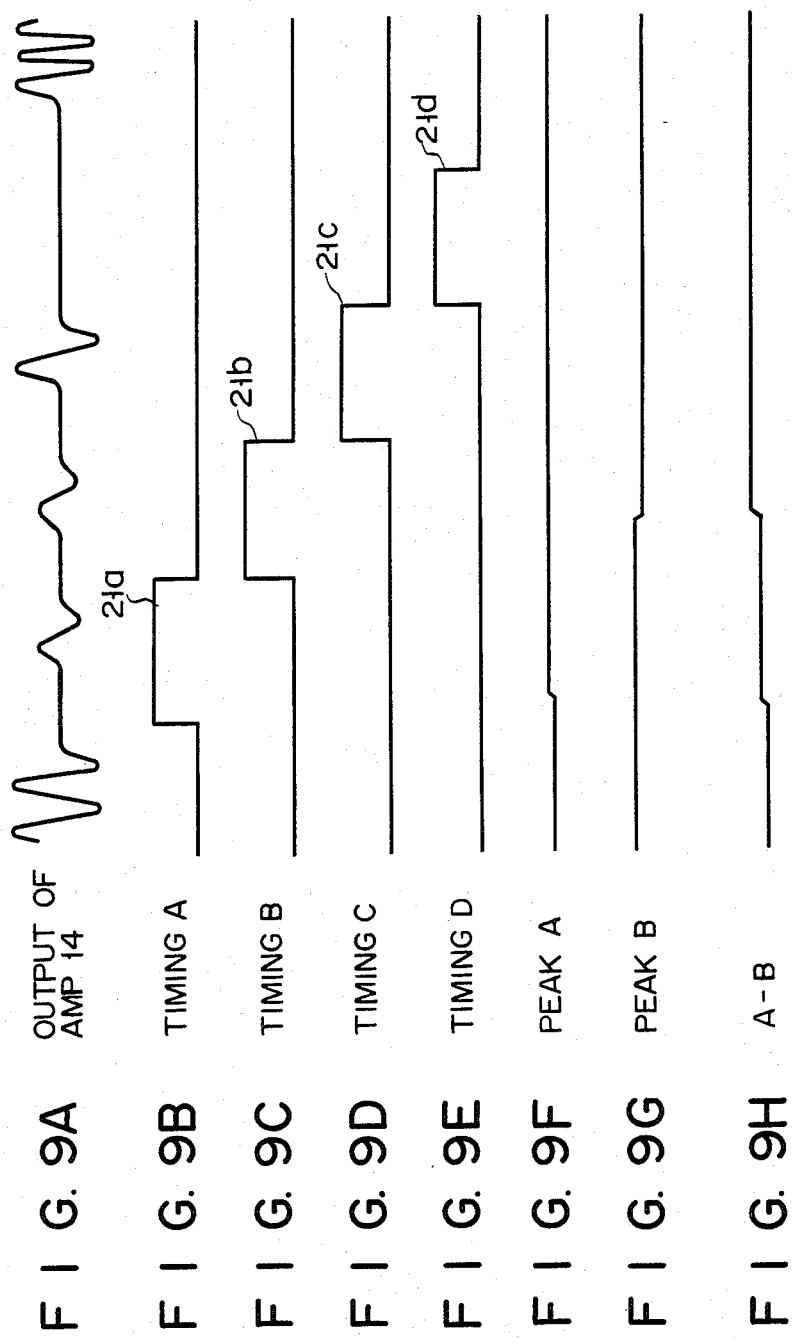
FIGS. 9A through 9H are timing charts of output signals from the servo circuit shown in FIG. 8, FIG. 9A showing an output signal from an amplifier 14, FIGS. 9B through 9E showing timing signals A through D from a timing generator 21, FIG. 9F showing an output signal A from a peak hold circuit 22, FIG. 9G showing an output signal B from a peak hold circuit 23, and FIG. 9H showing an output signal A−B from an operational amplifier 26.

The servo circuit 16 has a circuit 30 for producing a position signal, which is shown in FIG. 8. The peaks of the output signal from the amplifier 14 are detected by a peak detector 20. In response to respective peak signals produced by the peak detector 20, a timing generator 21 produces timing signals A(21a), B(21b), C(21c) and D(21d). Four peak hold circuits 22 through 25 hold the respective peaks of the output from the amplifier 14 while they receive the timing signals from the timing generator 21, respectively. The output peaks A and B are supplied to an operational amplifier 26 which then produces a signal A−B. Similarly, an operational amplifier 27 produces a signal C−D. The timing charts shown in FIGS. 9A through 9H are obtained when the magnetic head 12 is aligned on the track 4N. The magnetic head 12 generates outputs in the same manner as described above when the magnetic head 12 is aligned on any other track.

From these two-phase signals A−B and C−D thus obtained, a four-track period signal can be produced which represents the position of the magnetic head 12 in the radial direction of the magnetic disc. Therefore, when the two-phase signals A−B and C−D are used, the position of the head 12 can be properly detected even when the magnetic head 12 is moved from one servo sector to another over a range between 1 track and 4 tracks.

Figure 10:
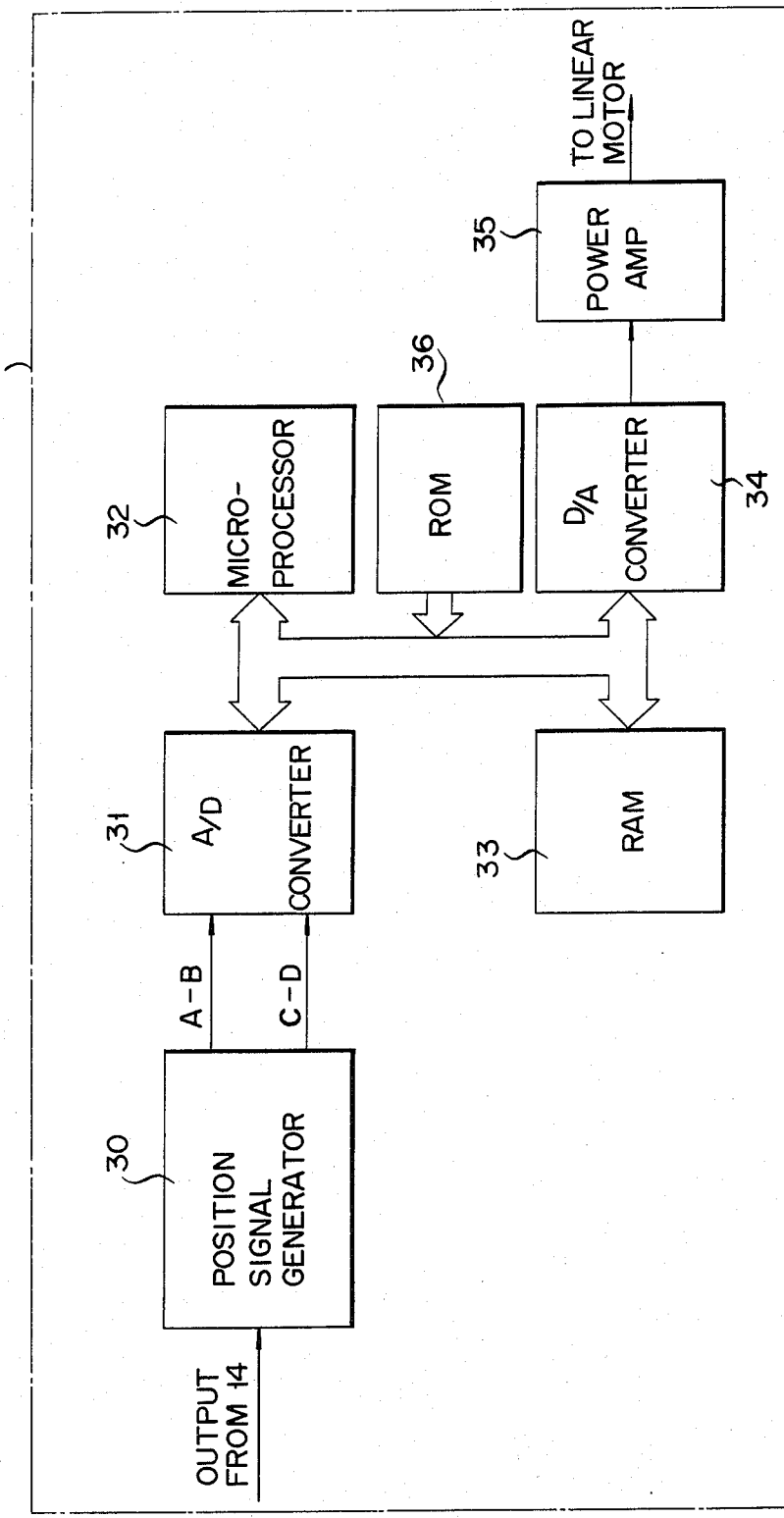
FIG. 10 is a block diagram showing the overall arrangement of the servo circuit shown in FIG. 3.

The two-phase position signals A−B and C−D are supplied to an analog-to-digital converter (hereinafter referred to as an A/D converter) 31 of the servo circuit shown in FIG. 10, a block diagram of the servo circuit 16 (i.e., the main element of the present invention). The position signal generator 30 has an arrangement as shown in FIG. 8. The two-phase position signals A−B and C−D are converted by the A/D converter 31 to digital signals which are supplied to a microprocessor 32 used as the data processor. The microprocessor 32 is, for example, an 8-bit microprocessor 8085 manufactured by Intel Corp. The microprocessor 32 performs the velocity control operation for seeking the target position of the magnetic head 12 in accordance with the program stored in a read-only memory (hereinafter referred to as a ROM) 36. The digital signal from the microprocessor 32 is supplied to a digital-to-analog converter 34 (hereinafter referred to as a D/A converter) and is converted to an analog signal. This analog signal is supplied as a driving signal to the linear motor 18 through a power amplifier 35. As a result, the linear motor 18 is driven so as to perform the seek operation of the magnetic head 12 mounted on the carriage 13.

The mode of operation of the system having the configuration described above will be described hereinafter.

In the general seek operation, the magnetic head 12 is driven at a maximum acceleration for a predetermined distance. The magnetic head 12 is then driven at a constant deceleration lower than the maximum acceleration such that the velocity becomes substantially zero when the magnetic head 12 reaches the target track. A target velocity V is given as follows:

$$V = \sqrt{2\alpha X} \tag{1}$$

where
- $\alpha$ is the constant deceleration, and
- X is the distance between the current head position and the target track.

When velocity control is performed by determining the target velocity V given by equation (1), the head velocity can be decreased at a rate equal to the constant deceleration $\alpha$.

Figure 11:
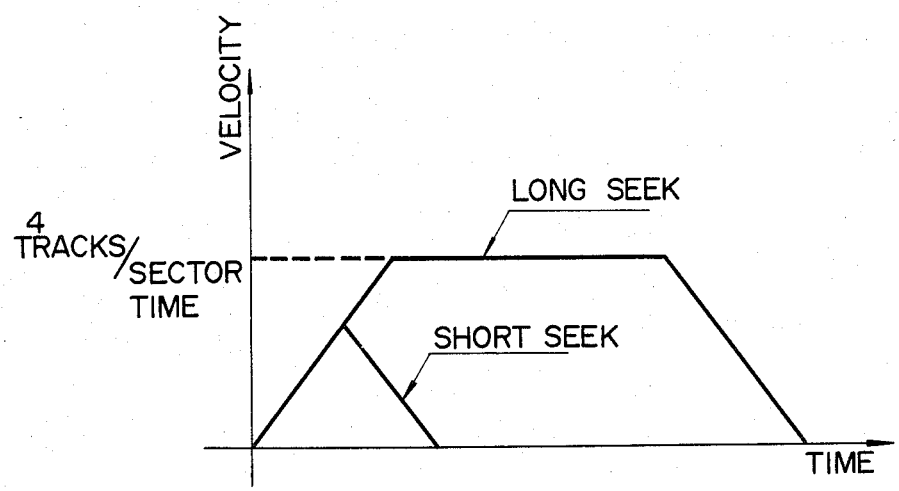
FIGS. 11 and 12 are schematic views explaining different seek velocities of the magnetic head.
Figure 12:
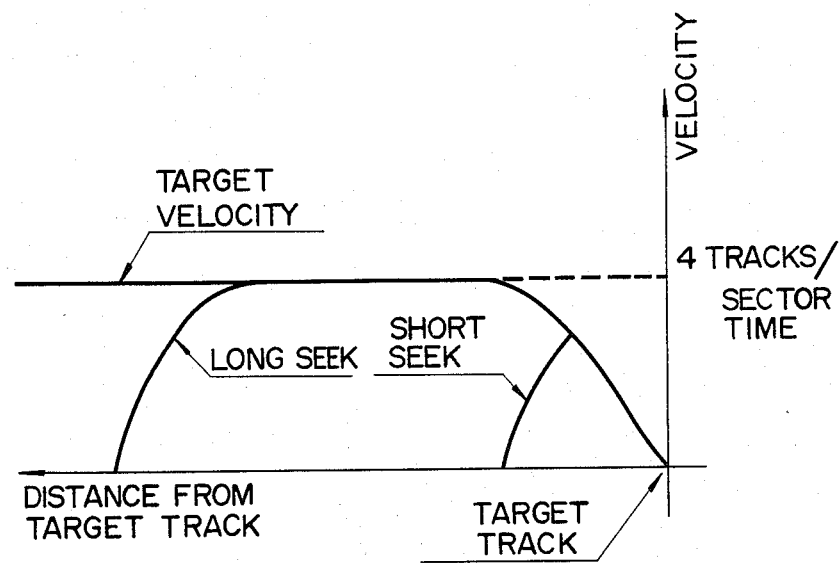

The position of the magnetic head 12 along the radial direction of the magnetic disc can be detected as a four-track period signal by the two-phase position signals A−B and C−D. Therefore, when the magnetic head 12 is moved over four tracks between the servo sectors (the head velocity will be referred to as a 4-tracks/sector time hereinafter), the travel distance cannot be unknown. The maximum velocity of the magnetic head 12 is limited in a range of 4-tracks/sector time. In order to perform a long seek operation, the velocity of the magnetic head 12 is elevated at the maximum acceleration until it reaches the maximum velocity as shown in FIG. 11, and is then lowered at a constant deceleration. In order to achieve the above control operation, the target velocity curve is determined in accordance with the distance between the current position of the magnetic head 12 and the target track. The velocity of the magnetic head 12 is increased at the maximum acceleration until it reaches the target velocity. When the real velocity of the magnetic head 12 reaches the target value, it is controlled in accordance with the target velocity curve. The velocity control operation is performed in accordance with the control program stored in the ROM 36 shown in FIG. 10.

Figure 13A:
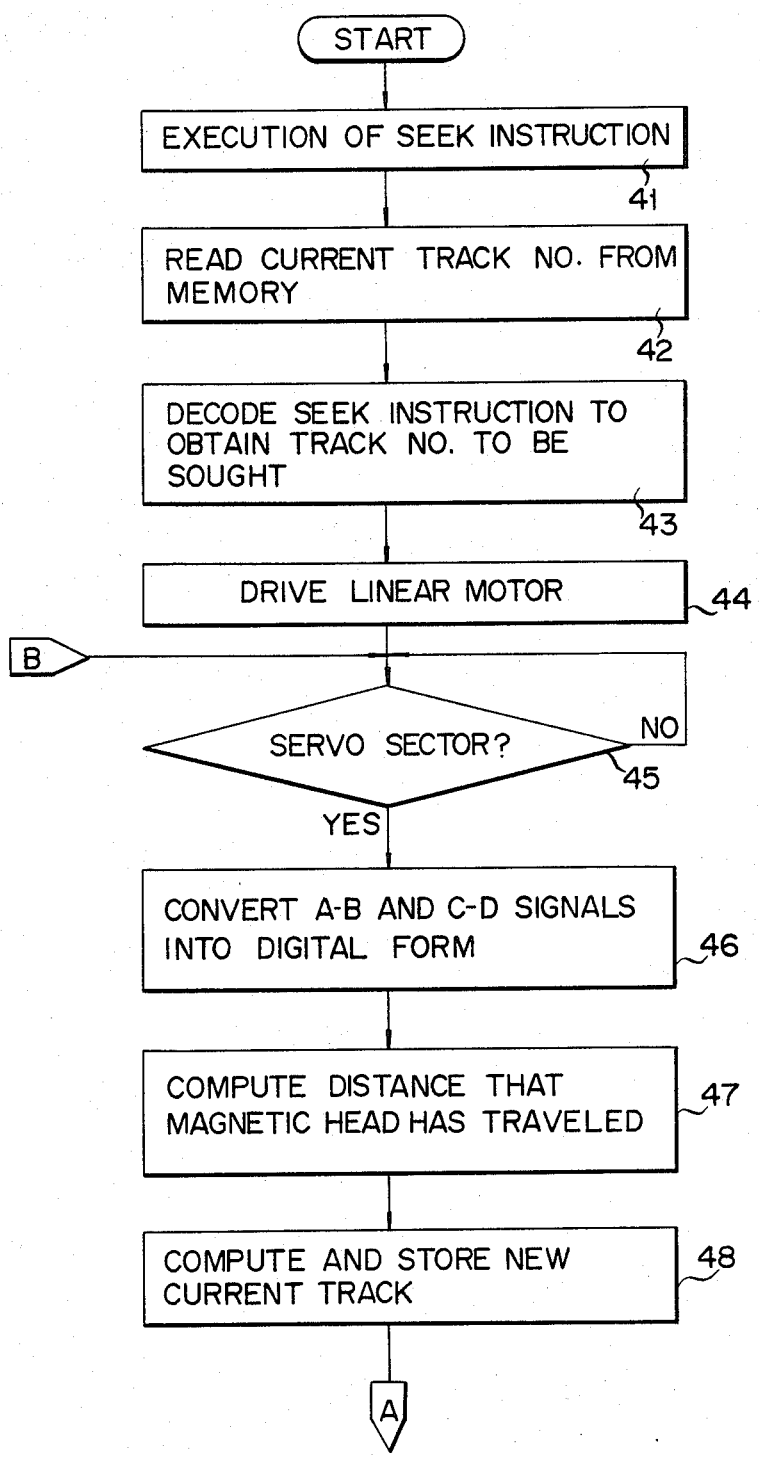
FIGS. 13A and 13B are flow charts explaining the mode of operation of the servo circuit shown in FIG. 10.
Figure 13B:
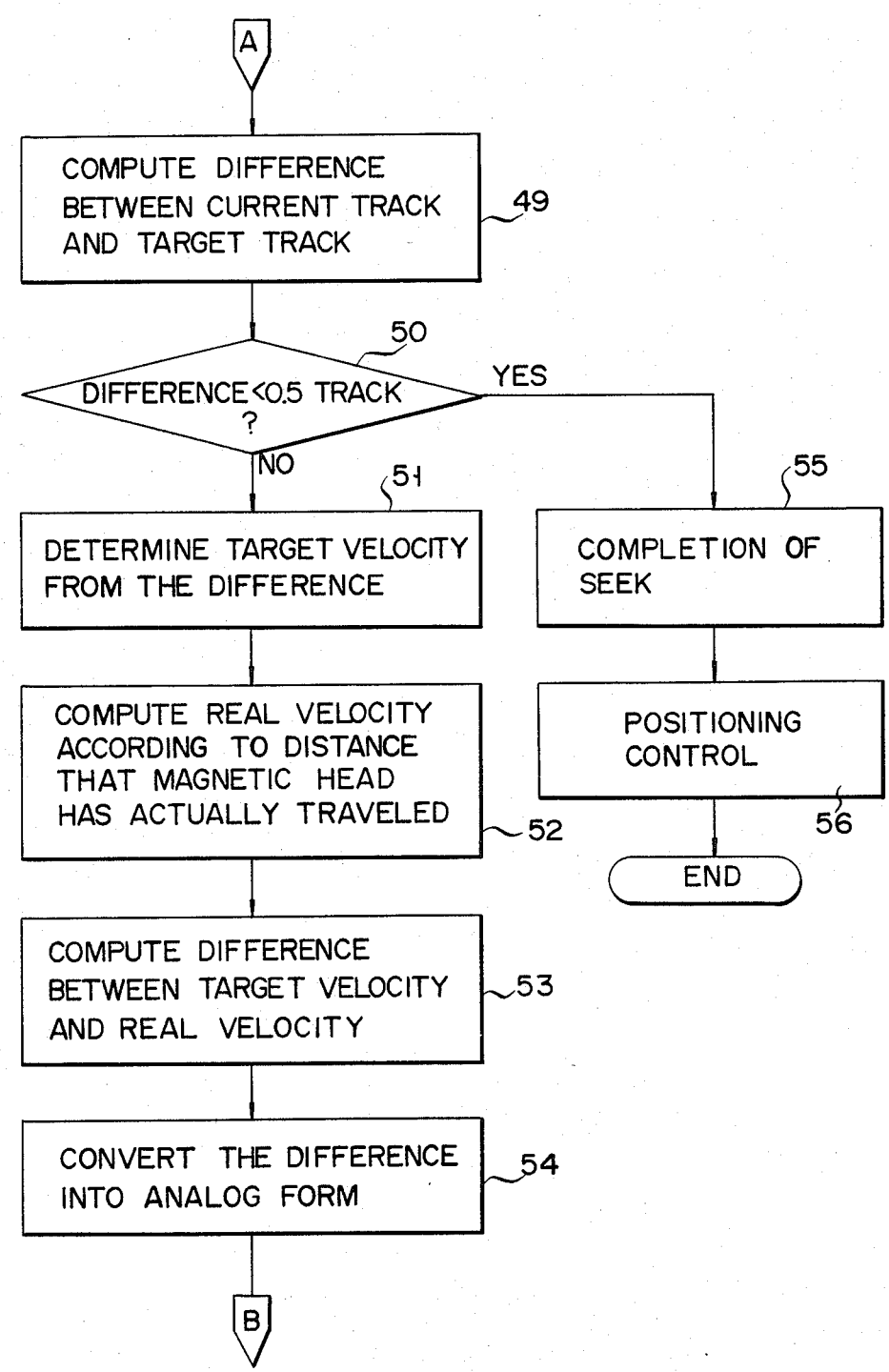
Figure 15:
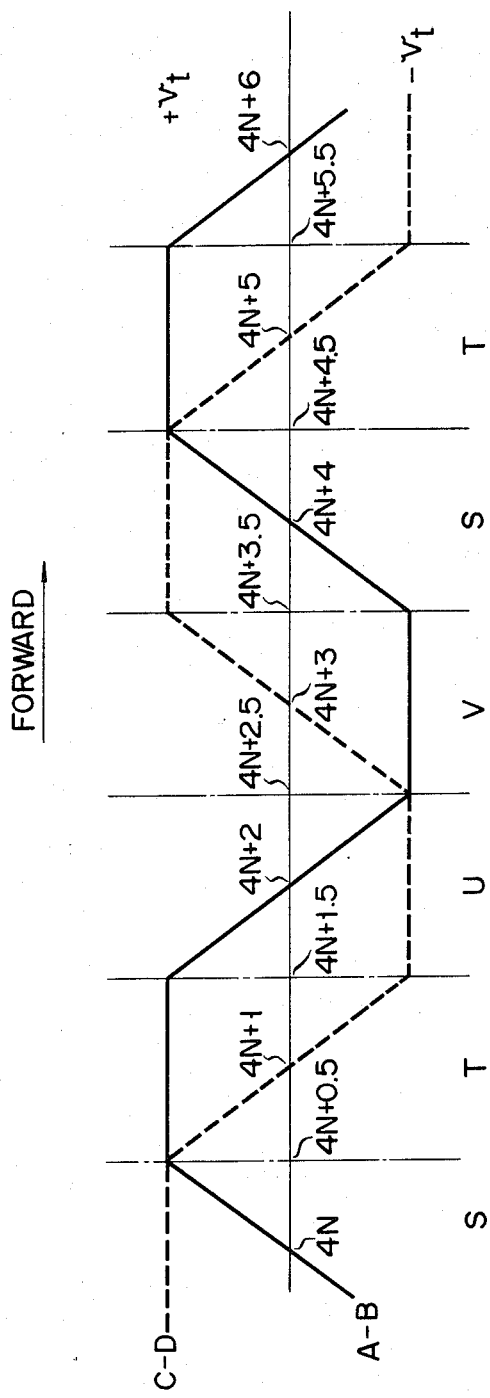
FIG. 15 is a view explaining a computation of a travel distance of the magnetic head.

The velocity control operation will be described with reference to the flow charts shown in FIGS. 13A and 13B. First, the microprocessor 32 receives a seek instruction from a host computer (not shown) and executes the corresponding seek routine in step 41. The seek instruction has the target track number as a parameter. In step 42, from the memory 33, the microprocessor 32, reads the current track number at which the magnetic head 32 is currently positioned. This can be achieved by storing the target track number designated by the previous seek instruction in the memory 33. In step 43, the seek instruction is decoded to determine the target track to be sought. In step 44, the linear motor 18 (FIG. 3) is energized with a maximum current, thus determining the travel direction of the magnetic head 12 in accordance with the target track and the current track. It is then determined in step 45 whether the magnetic head 12 has reached the next servo sector. If YES in step 45, the two-phase position signals A−B and C−D recorded in the corresponding servo sector are converted to digital signals. The digital signals are fetched in the microprocessor 32. In step 47, the distance that the magnetic head has travelled is computed in accordance with the two-phase position signals and the current track position. If this distance falls within a range of four tracks, it can be accurately measured. It is then checked if the magnetic head 12 is aligned with zone S, T, U or V shown in FIG. 15, after the two-phase position signals A−B and C−D are converted to digital signals. The distance that the magnetic head 12 has travelled can be computed in accordance with a matrix table (FIG. 16) based on the zone where the magnetic head 12 is positioned in the previous sampling and the zone where the magnetic head 12 is positioned in the current sampling.

Assume that the magnetic head 12 is on the track 4N+1 and is then moved to the track 4N+2, and a distance that the magnetic head 12 travels is to be computed. Referring to FIG. 16, the previous sampling zone is the zone T and the current sampling zone is the zone U. The distance is then computed as follows:

$$\text{(Previous (C−D))} - \text{(C−D)}_{MIN} + \text{(A−B)}_{MAX} - \text{(Current (A−B))} \tag{2}$$

Here assume that the high level of each of the signals A−B and C−D is given as "1", and that the low level thereof is "0". The signal (Previous (C−D)) is logic level "1". The signal (C−D)$_{MIN}$ is constantly set at logic level "1" in the zone T. The signal (A−B)$_{MAX}$ is set at logic level "1". The signal (Current (A−B)) is set at logic level "0". As a result, relation (2) is obtained as 1 (=(1)−(1)+(1)−(0)), thereby computing the distance. In step 48, the obtained distance is added to the current track, thus updating the current track. The updated current track data is stored. In step 49, a difference between the updated current track and the target track is computed. It is then determined in step 50 whether or not the difference falls within a range of 0.5 tracks. If YES in step 50, the seek operation is completed in step 55. In step 56, the magnetic head is controlled to be positioned immediately above the target track. However, if NO in step 50, the target velocity corresponding to the difference is determined in step 51. The target velocity data is prestored as a data table in the memory 33 so as to satisfy equation (1). In step 53, the velocity (real velocity) of the magnetic head 12 is computed from the actual distance (obtained in step 47) that the magnetic head 12 travels. The real velocity is obtained by dividing the real travel distance by a servo sector distance. In step 53, the difference between the real velocity and the target velocity is computed. In step 54, data corresponding to the difference is converted to an analog signal. This analog signal is supplied to the linear motor 18 through the power amplifier 35, as shown in FIG. 10. In other words, a current flows in the linear motor 18 so as to control the driving velocity of the magnetic head. In this case, if this velocity difference is small, a current corresponding to the difference flows to the linear motor 18. If the velocity difference exceeds a predetermined level, the difference is computed or the current is clamped by the power amplifier 35 to a predetermined value. The predetermined current is the maximum current. When the difference between the target velocity and the real velocity is great, the maximum current flows in the linear motor 18. When the velocity difference approaches the predetermined range, the above-mentioned velocity control is performed. In this manner, even if the magnetic head is moved over one track (within four tracks in this embodiment) from one servo sector to another, the proper track position can be detected. As shown in FIG. 14, when the magnetic head 12 is radially moved on the magnetic disc, the two-phase position signals A−B and C−D are obtained. The radial position of the magnetic head 12 can be determined in accordance with the four-track period signal. Therefore, when the two-phase position signals A−B and C−D are used, the current track position can be determined even when the magnetic head 12 is moved over one track from one servo sector to another in the seek mode. For example, as shown in FIG. 14, the signal A−B is positive when the magnetic head 12 is moved by one track. The signal C−D is negative when the magnetic head 12 is moved by two tracks. The signal A−B is negative when the magnetic head 12 is moved by three tracks. A difference between the detected current track postion and the target track is computed to obtain the target velocity and the real velocity. A difference between the target velocity and the real velocity is then computed. An analog signal corresponding to the velocity difference is supplied to the linear motor 18, thereby properly controlling the velocity of the magnetic velocity 12. As a result, the seek time of the magnetic head is greatly shortened.

What is claimed is:

1. A velocity control device for a magnetic disc apparatus for reading out from or writing data on a recording track of a magnetic disc having servo sectors and data sectors, using a magnetic head, comprising:
   (a) position signal generating means for generating a two-phase signal which determines a target position of said magnetic head;
   (b) analog-to-digital signal converting means for converting the two-phase signal to a digital signal;
   (c) computing means for computing a target velocity and a real velocity of said magnetic head from the digital signal and for computing a difference between the target velocity and the real velocity;
   (d) digital-to-analog signal converting means for converting the difference obtained by said computing means to an analog signal; and
   (e) driving means for driving said magnetic head in accordance with the analog signal.

2. A velocity control method for a magnetic disc apparatus for reading out from or writing data on a recording track of a magnetic disc having servo sectors and data sectors, using a magnetic head, comprising the steps of:
   (a) generating a two-phase signal which determines a target position of said magnetic head;
   (b) converting the two-phase signal to a digital signal;
   (c) computing a travel distance of said magnetic head in accordance with said two-phase position signal and a current track position of said magnetic head;
   (d) updating the current track position in accordance with the travel distance and computing a difference between an updated current track position and a target track;
   (e) determining a target speed corresponding to the difference between the updated current track position and the target track;
   (f) computing a real speed of said magnetic head;
   (g) computing a velocity difference between the target velocity and the real velocity;
   (h) converting the velocity difference between the target velocity and the real velocity to an analog signal; and
   (i) driving said magnetic head in accordance with the analog signal.

* * * * *